Nov. 4, 1958     P. G. SCHUENEMANN, JR     2,858,614
APPARATUS FOR MEASURING THICKNESS OF LAP AND THE LIKE
Filed Nov. 29, 1954     2 Sheets-Sheet 1
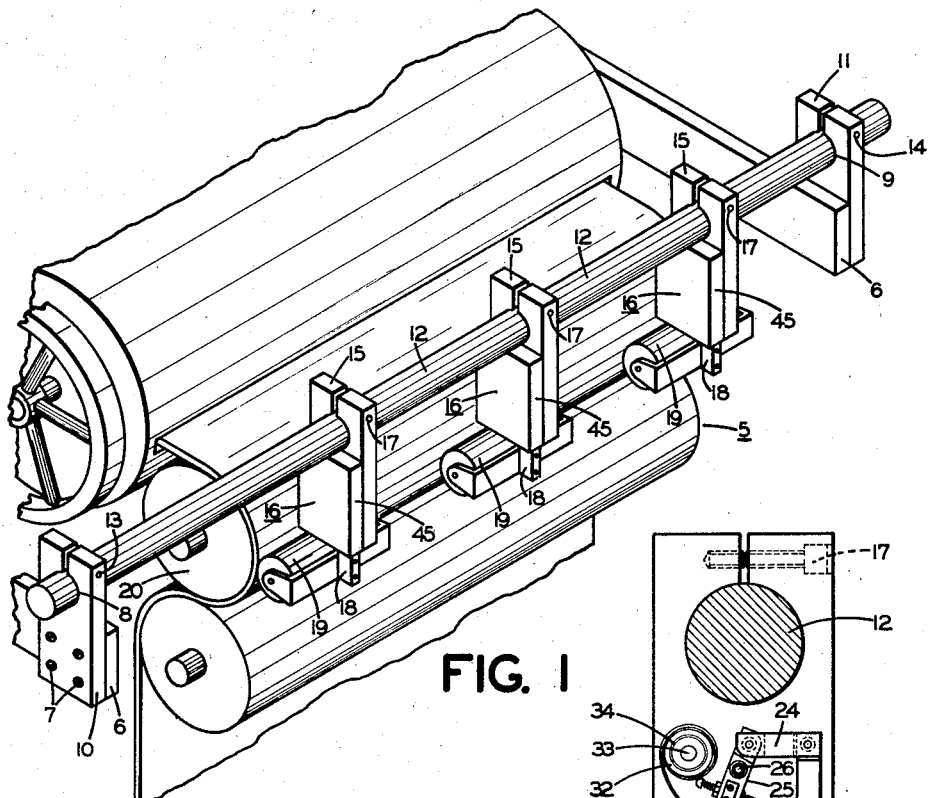
FIG. 1
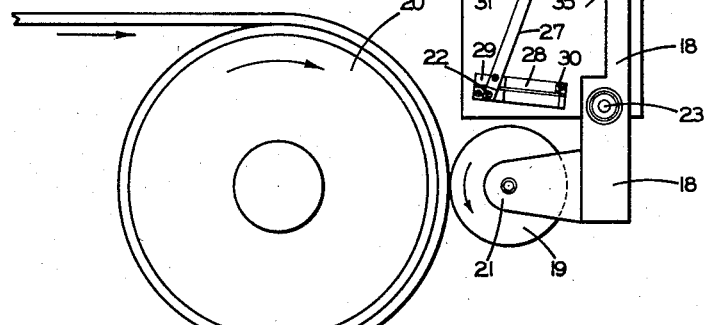
FIG. 2
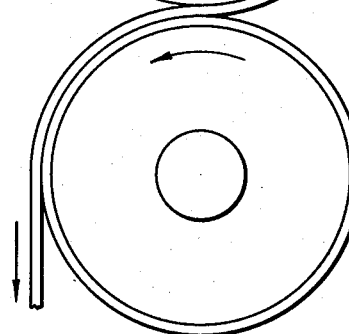
INVENTOR.
PAUL G. SCHUENEMANN JR.
BY
AGENT Nov. 4, 1958  P. G. SCHUENEMANN, JR  2,858,614
APPARATUS FOR MEASURING THICKNESS OF LAP AND THE LIKE
Filed Nov. 29, 1954  2 Sheets-Sheet 2
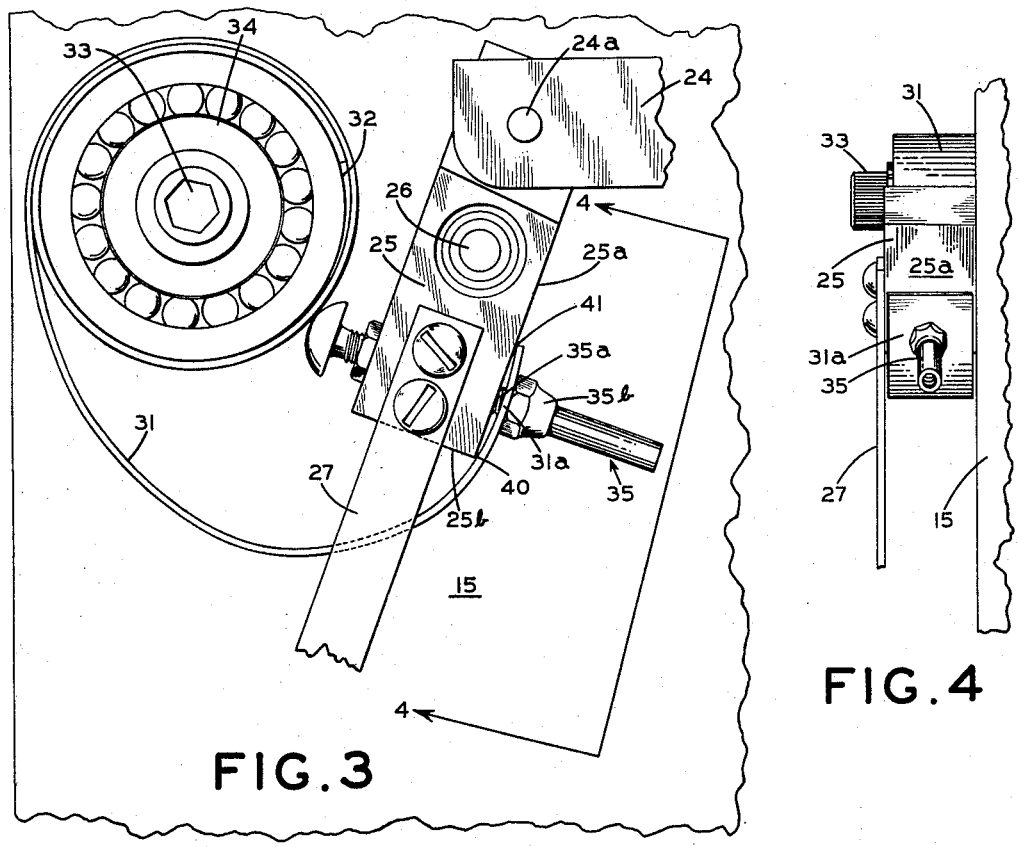
FIG.3
FIG.4
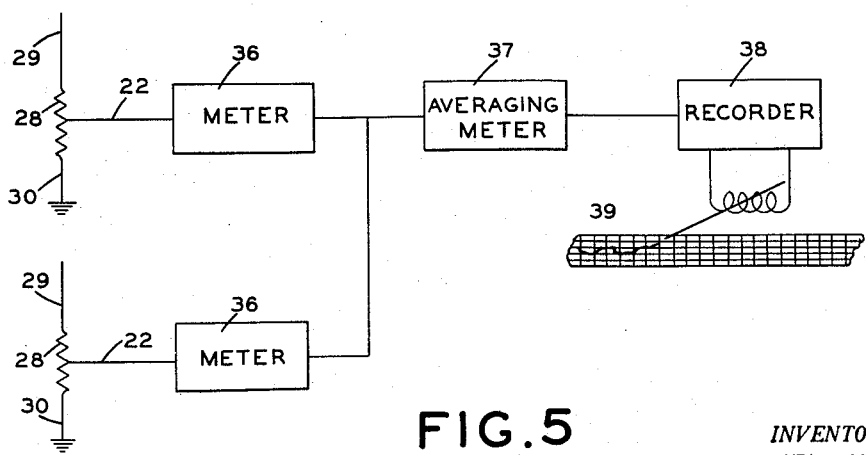
FIG.5
INVENTOR.
PAUL G. SCHUENEMANN JR.
BY
ATTORNEY United States Patent Office 2,858,614
Patented Nov. 4, 1958

2,858,614

APPARATUS FOR MEASURING THICKNESS OF LAP AND THE LIKE

Paul G. Schuenemann, Jr., Westlake, Ohio, assignor to Clevite Corporation, Cleveland, Ohio, a corporation of Ohio Application November 29, 1954, Serial No. 471,680

4 Claims. (Cl. 33—148)

This invention relates to an improved thickness measuring apparatus and, more particularly to such apparatus adapted to measure the thickness of textile lap and the like while being processed.

In a process of producing textile products one of the first steps is the alignment of the loose random fibers into a loose mat or lap by means of a picker machine. It has been found that the quality of the finished textile product is influenced by the control of the thickness of the lap and that a lap of uniform thickness produces a superior product. The thickness of the lap may be controlled by the operator of the picker machine by adjusting the rate of feed of the loose fibers; however, some means is required to inform the operator of changes occurring in the lap thickness so the necessary corrections may be made immediately while the lap is being processed.

One type of thickness measuring apparatus which has been previously used for such purpose operates on the change in capacitance between two condenser plates due to the passage of textile lap therebetween. A disadvantage of such an arrangement is that a true picture of the thickness is not achieved since the capacitance is also dependent upon the moisture content of the textile lap. Furthermore, the thickness at individual points across the width of the lap is not obtained.

In certain prior art lap-thickness-measuring apparatus a plurality of feeler members are positioned to engage the surface of the textile lap passing over a drum, each feeler member activating a respective servo-motor in accordance with the lap thickness. Such apparatus, however, is not adapted to make thickness measurements of the textile lap while it is being processed, and thus permit concurrent thickness corrections. Furthermore, the signals from the servo-motors are of insufficient magnitude to permit direct recording thus necessitating the expense of using preamplifiers which may introduce a source of error.

It is an object of this invention, therefore, to provide a new and improved thickness-measuring apparatus which substantially avoids one or more of the limitations and disadvantages of the prior art arrangements.

It is a further object of this invention to provide an improved thickness-measuring apparatus for determining the individual thickness at spaced points across the width of a material such as textile lap and the like as well as the average thickness across the width and variations in average thickness along the length thereof.

A further object of the invention is the provision, in a thickness measuring apparatus, of means for exerting a resilient biasing force between two relatively movable members which biasing force is adjustable and thereafter constant in magnitude for all positions of said members.

A further object of this invention is to provide an improved thickness sensing arrangement adapted to be integrated into electrical averaging and recording circuits.

In accordance with one embodiment of the invention there is provided thickness measuring apparatus comprising a plurality of sensing devices positioned across the calendar roll of a lap picker machine or other material moving and supporting means. Each sensing device comprises a feeler member movable in respect to the thickness of a material passing over the supporting means; movement multiplying means, an electrical sensing element adapted to develop electrical signals proportional to the position of the feeler member, circuit means for combining the developed signals from each feeler member to derive an average signal and means for registering the derived signal.

For a better understanding of the present invention, together with other and further objects thereof, reference is had to the following description taken in connection with the accompanying drawings and its scope will be pointed out in the appended claims.

In the drawings:

Figure 1 shows by way of an isometric representation a portion of a picker machine embodying the present invention.

Figure 2 is a cross-sectional view of the apparatus of Figure 1.

Figure 3 is an enlarged and more detailed view of a fragment of the sensing mechanism of Figure 2.

Figure 4 is a view of the structure shown in Figure 3 looking in the direction of arrows 4—4.

Figure 5 is a circuit diagram of a typical circuit embodied in the present invention.

Referring to Figure 1 of the drawings, there is shown the calendar section of a picker machine generally indicated at 5. Attached to side members 6 thereof by means such as bolts 7 are sensing apparatus support members 10 and 11.

Supported between support members 10 and 11 is a rod member 12 passing through slotted bores 8 and 9 and secured thereto by the action of screws 13 and 14. A plurality of sensing devices 16 are suspended from rod 12 by means of supports 15 attached to rod 12 in a manner similar to supports 10 and 11 and secured by screws 17. Supports 15 also serve as base plates upon which sensing devices 16 are assembled. Each sensing device comprises, as a feeler member, a roller 19 which is resiliently biased against a calendar roll 20 of lap picker 5, as hereinafter explained.

Figures 2, 3 and 4 afford a more detailed view of sensing devices 16. Inasmuch as each sensing device 16 is the same, only one will be described in detail. Roller 19, provided to cooperate with calendar roll 20 which acts as the support for the material during the thickness measuring operation, is mounted at the forward end 21 of a feeler lever 18. Preferably and as shown the feeler lever 18 is mounted for rocking movement upon a stub shaft or pintle 23 attached perpendicularly to base plate 15. At its upper end crank lever 18 is pivotally connected to a link 24 in turn pivotally connected as at 24a to a downwardly extending lever 25 mounted for rocking movement upon another stub shaft or pintle 26 also attached perpendicularly to base plate 15. Contact arm 27 is attached to lever 25 to move therewith and contact 22 is attached to the lower end of arm 27 to make sliding engagement with sensing element 28 mounted on base plate 15. Sensing element 28 may conveniently be a resistance element having electrical contacts 29 and 30 at either end to act as a potentiometer in cooperation with the sliding contact 22 of arm 27. A multiplication of the movement of roller 19 takes place as a result of the lever system design between roller 19 and the contact 22 of arm 27 in contact with sensing element 28. Roller 19 is biased to the left as viewed in Figure 2 of the drawings by means of a spring 31 which operates to provide a substantially constant force throughout the travel of roller 19 and associated lever 18, as will now be described.

As best appears in Figure 3, spring 31 is a flat spiral spring, also known in the art by various other names such as a clock, power or motor spring. A major portion of the length of spring 31 is coiled about a drum or hub 32, freely rotatably mounted on a stub shaft or axle 33 by means of an anti-friction bearing 34 of the ball, roller or needle type. Axle 33 mounts bearing 34 on base plate 15 providing an axis of rotation perpendicular to the plate and, therefore, parallel to that defined by pintle 26.

Lever 25 has at least one planar surface 25a, on its side remote from drum 32, which is in a plane parallel to the rotational axis of the drum and, in the direction of said axis, is at least as wide as spring 31. The radially outermost portion of spring 31 is uncoiled from drum 32, passes around the end of lever 25 remote from pivotal connection 24a and its extreme end portion is secured to surface 25a of the lever by means of a threaded fastener 35. As shown in Figure 3, the aforementioned end portion of spring 31 due to its arcuate "set," makes line contacts with lever 25 at two spaced locations 40 and 41. At 41, the extreme end of spring 31 is in line contact with surface 25a at a substantial distance from the free end of lever 25. The other line of contact, 40, is at the corner edge of lever 25 defined by the intersection of side surface 25a with the end surface 25b. Thus it will be seen that the section of surface 25a lying between contact lines 40 and 41 is a chord of the arcuate section 31a of spring 31 extending between said contact lines.

Arcuate section 31a of spring 31 is centrally apertured to accommodate passage of a threaded portion 35a of fastener 35, adjustably engaging in a suitably tapped and positioned bore (not shown) in surface 25a. A radial enlargement 35b on fastener 35 abuts the outer surface of arcuate spring section 31a. Thus, it will be seen that the radius of curvature of section 31a and spring 31 as a whole is subject to adjustment by turning fastener 35 to adjust the spacing between surface 25a and the opposing surface of enlargement 35b. Threading fastener 35 farther into lever 25 tends to flatten out section 31a and increase the tension in spring 31; turning fastener 35 in the reverse direction has an opposite effect. In this manner an adjustment in tension of spring 31 amounting to as much as 30% can be accomplished. Once set, the tension remains substantially constant throughout the length of travel of lever 25. This provides a convenient means of adjusting spring force to compensate for variations from one spring to another and allows the spring force of each sensing device to be standardized individually. Cover 45 is provided to enclose the mechanism of the sensing devices 16 and are fastened to the base plate and support 15 by screws (not shown).

From Figure 2 it will be readily understood that the movement of roller 19 to the right as a result of material passing between it and calendar roll 20 will cause feeler crank lever 18 to pivot counterclockwise about pintle 23 moving link 24 and the upper end of lever 25 to the left. As the upper end of lever 25 moves to the left it will pivot about pintle 26 moving the lower end of lever 25 to the right. Since contact arm 27 is connected to lever 25 and is an extension thereof, it too will move to the right, sliding contact 22 at the end of arm 27 across sensing element 28. Spring 31 maintains a constant bias on roller 19 such that as material passing between roller 19 and calendar roll 20 varies in thickness, roller 19 will move toward and away from the calendar roll 20 in response thereto and position contact 22 on sensing element 28 at a point proportional to the position of roller 19. A standard voltage is impressed across the sensing element 28 by connecting a source of voltage to terminals 29 and 30. The voltage appearing between terminal 29 and contact 22 is then representative of the thickness of material under roller 19 at any one instant.

In operation the sensing devices 16 are so adjusted on support 12 that roller 19 engages the material to be tested. As shown in Figure 5, a standard voltage, is impressed across sensing elements 28 through terminals 29 and 30. The signal voltages existing between terminals 29 and respective contacts 22 of each sensing device 16 gives a representation of the thickness of a material passing under each roller 19 and may be registered on individual meters 36. The signal voltages from each sensing device are fed to an averaging meter 37 to give a reading representing the average thickness read by all sensing devices and may further be applied to any conventional automatic recording device 38 to produce a continuous record 39 of the thickness of a material as it is advanced over calendar roll 20. A bias on roller 19 of about 15 pounds is found to be satisfactory for one application.

The device of this invention may further be used to provide a run out test on the calendar roll to determine an out-of-round condition. A mechanical zero of the sensing devices may be accomplished by positioning rollers 19 on member 12 to bear against the calendar roll 20 and a fine electrical adjustment zero may be provided in the circuitry.

It will be apparent to those skilled in the art that sensing means other than a resistance element, such as an inductance or capacitance may be used with suitable circuits to provide an indication of the variation in thickness of material. The thickness of materials other than textile lap may also be measured by the apparatus of this invention.

While there has been described what at present is considered to be the preferred embodiment of this invention, it will be obvious to those skilled in the art that various changes and modifications may be made therein without departing from the invention. It is aimed therefore in the appended claims to cover all such changes and modifications which fall within the true spirit and scope of the invention.

I claim:

1. In thickness sensing apparatus: a base plate; a feeler lever and a contact lever individually mounted thereon for limited pivotal movement, a link connecting said feeler lever and said contact lever; an anti-friction bearing mounted adjacent said contact lever; a flat spiral spring mounted around said bearing and having its free end adjustably attached to the contact lever in such manner that the radius of curvature of a portion of said spring can be varied; a resistance element; an electrical contact mounted on said contact lever in slidable contact with said resistance element and adapted to develop as a signal voltage the value of which is dependent upon the positioning of the feeler lever.

2. In a thickness sensing apparatus, a lever mounted for limited pivotal movement and having a planar surface substantially parallel to the axis of said pivotal movement; a cylindrical hub member mounted for axial rotation about an axis parallel to that of pivotal movement of said lever; a flat spiral spring having a major end portion coaxially wound about said hub member and a portion of its opposite end, arcuate due to the normal set of the spring, in contact with said lever so that said planar surface assumes a chordal position with respect to and subtends said arcuate end portion of the spring; and adjustable means for mechanically coupling said arcuate end portion to said lever and varying the radius of curvature of said arcuate end portion.

3. Apparatus for measuring the average thickness of a lap of textile material and adapted to be mounted adjacent means for supporting and moving such material, comprising: a plurality of thickness sensing feeler members positioned across said moving and supporting means, adjacent the surface thereof and movable in response to variations in the thickness of lap passing between said feeler members and said moving and supporting means; a base plate for each of said feeler members, a feeler lever connected to each of said feeler members and mounted upon the respective base plate for limited pivotal movement; a contact lever mounted on each said base plate; a link connecting each said feeler lever to the respective contact lever; an anti-friction bearing mounted adjacent each said contact lever; a flat spiral spring mounted around each said bearing and having its free end adjustably attached to the respective contact lever in such manner that the curvature of a portion of said spring may be varied; a plurality of resistance elements; an electrical contact mounted on each said contact lever in sliding engagement with a respective one of said resistance elements and adapted to develop, as a signal voltage, a portion of a predetermined voltage impressed across said resistance elements which signal voltage is representative of the position of the respective thickness sensing feeler members; circuit means for combining the signal voltages developed by each said contact to derive an average signal voltage; and means for registering said average signal voltage.

4. In a lap picker having a calendar roll, a thickness measuring apparatus associated with the calendar roll, comprising: a plurality of thickness sensing feeler members positioned across the calendar roll adjacent the surface thereof and movable in response to variations in the thickness of lap passing between said feeler members and said calendar roll; a base plate for each of said feeler members; a plurality of feeler levers each connected to one of said feeler members and mounted upon a respective base plate for rocking movement; a contact lever pivotally mounted on each said base plate; a link connecting each said feeler lever and a respective contact lever; a plurality of anti-friction bearings each mounted adjacent a respective contact lever; a flat spiral spring mounted around each of said bearings and having its free end adjustably attached to the respective contact lever in such manner that the radius of curvature of a portion of each said spring can be varied; a plurality of resistance elements; an electrical contact mounted on each said contact lever in sliding engagement with a respective one of said resistance elements, adapted to develop, as a signal voltage, a portion of a predetermined voltage impressed across said resistance elements which signal voltage is representative of the position of the respective thickness sensing feeler members; circuit means for combining the signal voltages developed by each said contact to derive an average signal voltage; and means for registering said average signal voltage.

References Cited in the file of this patent

UNITED STATES PATENTS

| | | |
|---|---|---|
| 1,560,046 | Dye | Nov. 3, 1925 |
| 2,647,743 | Cook | Aug. 4, 1953 |
| 2,680,299 | Strother | June 8, 1954 |

OTHER REFERENCES

American Machinist, page 699, November 2, 1922.